Aug. 21, 1962  M. S. MERRILL ETAL  3,049,927
APPARATUS FOR BALANCING ROTATING BODIES
Filed Dec. 15, 1958                              2 Sheets-Sheet 2

INVENTORS
MARCELLUS S. MERRILL
LOWELL H. ERICKSON
BY
*Philip H. Sheridan*
ATTORNEY

United States Patent Office 3,049,927
Patented Aug. 21, 1962

3,049,927
APPARATUS FOR BALANCING ROTATING BODIES
Marcellus S. Merrill and Lowell H. Erickson, Denver, Colo.; said Erickson assignor to said Merrill
Filed Dec. 15, 1958, Ser. No. 780,606
10 Claims. (Cl. 73—475)

This invention relates to the balancing of rotatable bodies and more particularly to an improved apparatus for determining both the static and dynamic unbalance of a rotating body.

Reference is made to U.S. patents to Merrill et al. No. 2,663,184, Erickson 2,758,487 and 2,761,323, the entire right, title and interest therein as well as to the present invention being in the name of Marcellus S. Merrill. Said three patents relate to balancing methods and apparatus which are efficient in operation and provide precision balancing, but it has been found that they are expensive to construct in that they include numerous costly elements and parts. In particular, the suspension means for the rotating bodies, in order to provide lateral rigidity and to eliminate extraneous vibrations and frictional loss, comprises numerous relatively costly parts. Thus there has been a need for precision balancing apparatus which is relatively inexpensive and the present invention has been found to fulfill this need.

Accordingly, the primary object of the present invention is to provide an improved apparatus for balancing a rotating body which is relatively inexpensive to construct, essentially due to the simplification and number of parts involved.

A further object is to provide improved and simplified apparatus of the type described which permits precision and accurate determination of the static and dynamic unbalance of a rotating body.

It is also an important object to provide an improved suspension structure for the rotating bodies which consists of a minimum of parts and which suspends the rotating bodies whereby precision observations of unbalance may be made.

Other objects and advantages of the invention will become apparent by considering the following detailed description in conjunction with the drawings wherein a preferred embodiment of the invention is illustrated and wherein:

FIGURE 5 is a sectional view taken along the lines 5—5 of FIGURE 2.

In actuality the balancing machine of this invention is patterned to a great extent after the principles of operation of Patent No. 2,663,184, but is greatly simplified in the number of parts involved and yet a machine is provided which when used in balancing bodies provides results that are sufficiently accurate in most cases. One of the principal improvements resides in the suspension structure, although it will be apparent that nearly all of the pertinent structure of Patent 2,663,184 has been arranged more compactly and is composed of a minimum of parts whereby a truly economical machine results.

Figure 1:
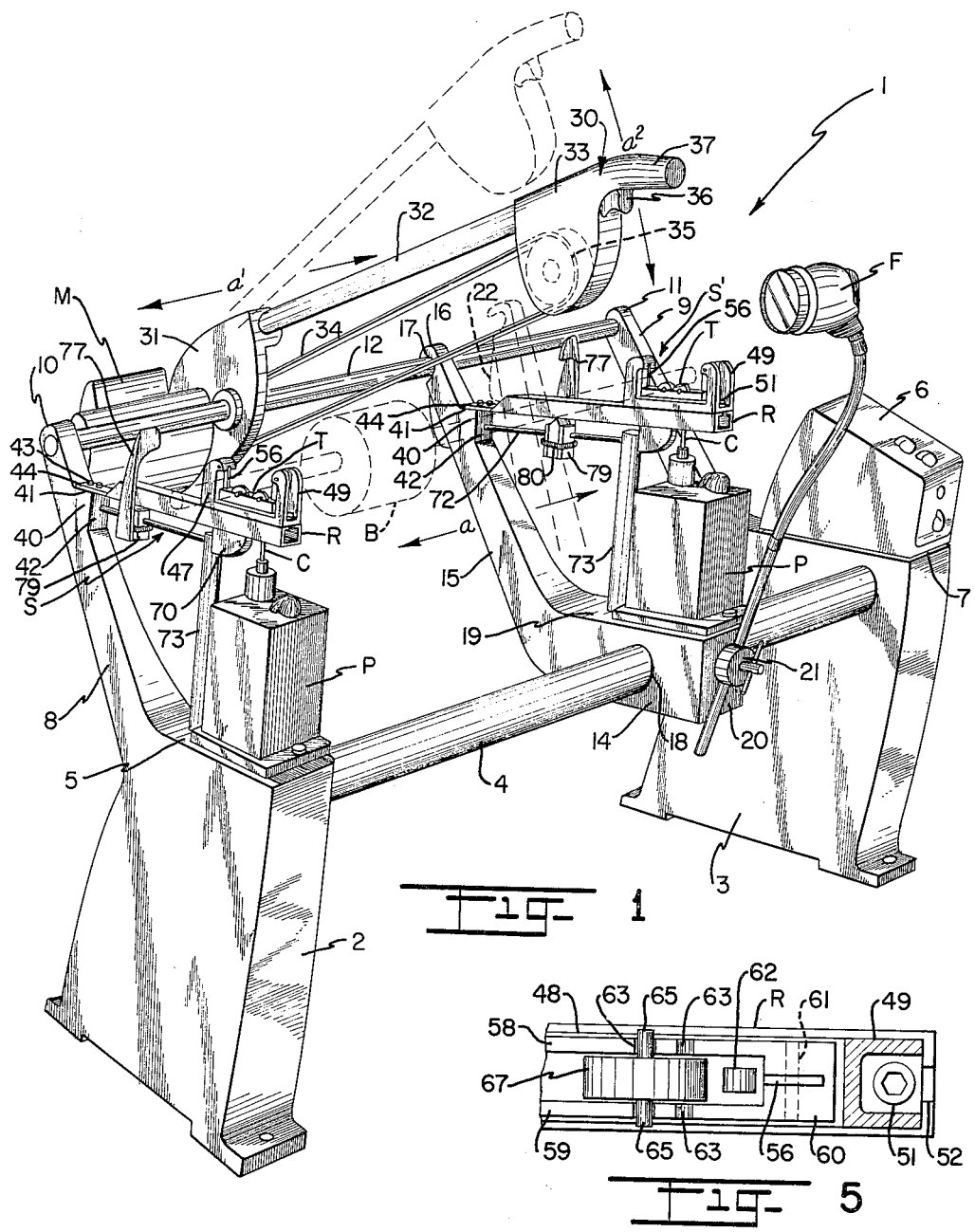
FIGURE 1 is a perspective view of a balancing machine embodying this invention and including in dotted lines a rotating body in position for determining unbalance thereof.

Now referring to FIGURE 1, there is illustrated a balancing machine generally represented by the numeral 1 for observing and determining the unbalance of rotating bodies so that such may be corrected in a well known manner, as by adding or removing weight at certain determined points of the body. Machine 1 includes as essential elements (A) a vibratory cradle or suspension means for supporting the body being balanced; (B) electrical pickup means for sensing vibrations; (C) means for rotating the body; (D) suitable instrumentation including a stroboscopic or equivalent device; and (E) framework for supporting and carrying the mentioned apparatus. As to the latter, such includes two substantially rectangular upstanding and spaced hollow metal housings 2 and 3 interconnected by a solid rod 4. At the top 5 of housing 2 there is suitably and detachably supported one of the electrical pickup units P and a casing 6 containing electrical equipment which is positioned and supported, preferably detachably, on the top of housing 3. A stroboscopic device F, which as illustrated is in the form of a stroboscopic lamp, together with the pickup units P are electrically connected by means not shown with the instrumentation within casing 6. Actually there is a meter, not shown, on the rear of device F and the equipment within casing 6 is generally at least equivalent to that included in casing E of Patent 2,663,184, it being understood that there are more dials, knobs, etc. on casing 6 than illustrated. As in said patents, in order to determine and observe the place and amount of unbalance of a body B, the latter is suspended so that vibrations during rotation thereof are electrically sensed by the pickup units P which are connected into an electronic hookup having associated therewith the device F and interpreting instrumentation within casing 6 for making the necessary observations and to determine the amount and place of unbalance, this entire electrical hookup only being mentioned and illustrated generally as it per se forms no part of the instant invention. Of importance is the fact that housings 2 and 3 are hollow to receive, through an access door not shown, or through an opening in the top surfaces that are exposed upon removing the units supported thereon, a damping medium such as sand or liquid to absorb extraneous vibrations and to reduce harmonics by absorption thereof.

The framework also includes arms 8 and 9 which are integral with housings 2 and 3, respectively, and which extend rearwardly and upwardly therefrom, as illustrated in FIGURE 1. At their tips 10 and 11 the arms 8 and 9, which may be tubular metal or solid castings, are connected by rail 12. Mounted for manually activated sliding movement on rod 4 is a mounting 14 also having integral therewith a rearwardly and upwardly extending rigid arm portion 15, similar to arms 8 and 9, which at its tip 16 is grooved or recessed as at 17 to partly receive and clasp to rail 12. The mounting 14 receives rod 4 in sliding relationship through transverse bore 18 and on its flat top 19 is supported and carried one of the units P. Also end wall 20 of mounting 14 has extending therefrom a suitable joint 21 for carrying the stroboscopic device or stroke unit F and permitting manual adjustment of its flexible supporting arm relative to body B. Adjacent the tip 16 there is provided latch means in the form of a pivotally mounted dog 22 and when this dog is in the solid line position of FIGURE 1, portion 15 is clasped in the solid line position thereof as the dog carries means not shown engaging rail 12. However, upon pivoting dog 22, portion 15 and mounting 14 are free to be pivoted about rod 4 and manually moved in the direction of arrows A, as exemplified in FIGURE 1 by the dotted line position of portion 15.

Thus far the essential framework has been described and it should be noted that the arms 8 and 9 together with portion 15 when in its clasped position are substantially coplanar with each other and that they, together with the rod 4, rail 12, housings 2 and 3 and mounting 14, provide structure which is composed of a minimum of parts, which is durable and compact and which, together with the suspension means and structure to be described, permits economical precision balancing of various rotatable bodies, such as rotors, spindles, clutches, wheels, couplings and chucks. As in said patents, pickup units P include an electro-magnetic pickup which relays the degree of amplitude of vibration, electrically, to the interpreter until within casing 6 and a variable damping dashpot which controls the magnitude of mechanical vibration of a body B being balanced. The body B is supported on "trunnion bearings," to be described, where it is spun rapidly and allowed to coast through the critical or resonant speed and the resultant mechanical vibration is converted by the electro-magnetic dashpot/pickups into electrical impulses of proportional amplitude which are interpreted in a manner disclosed in said patents to provide information for counter-balancing body B at the proper locations.

The trunnion bearings of this invention may for now be referred to at T and the drive unit for rotating and stopping body B generally by the reference 30, the latter by itself also forming no part of this invention. Unit 30 includes a support 31 manually slidable on rail 12 in the direction of arrows $a^1$, and also manually pivotable in the directions of arrow $a^2$ and as illustrated in the solid and dotted lines of FIGURE 1. Support 31 carries drive motor M and has extending therefrom an arm 32 which supports a drive control assembly 33. There is provided a driving belt 34 extending around two spaced pulleys, one of which is shown at 35, and an actuating button 36 results in motor M driving the belt at the desired and necessary speed. Numeral 37 represents a handle whereby the operator may readily lower the belt to cause it to engage the body B and for the purpose of limiting other pivotal movement of drive unit 30 there may be provided any suitable means, such as stops not shown, for engaging rail 12. With the foregoing description, the operation of the drive unit should be explanatory, it being understood that other and more costly drive assemblies may be incorporated, such as that shown in said Patent 2,758,487 wherein there is also provided a means for braking the belt to permit it to frictionally engage and stop rotation of body B after it has been brought up to a desired speed of rotation and observations have been completed.

Figure 2:
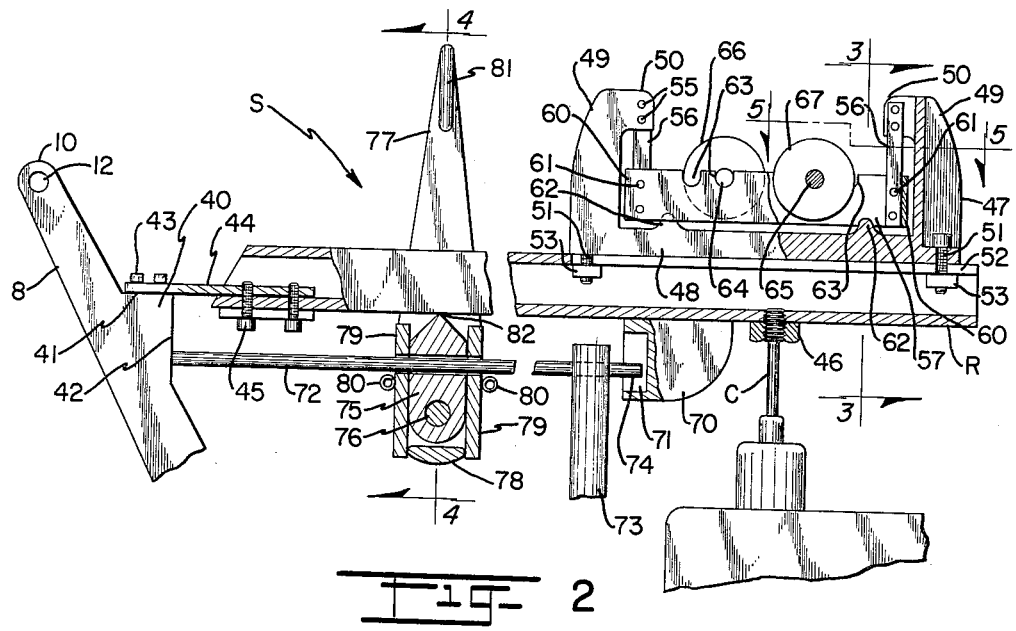
FIGURE 2 is a side elevational view partly in section of one of the suspension means or units for the body being balanced.
Figure 4:
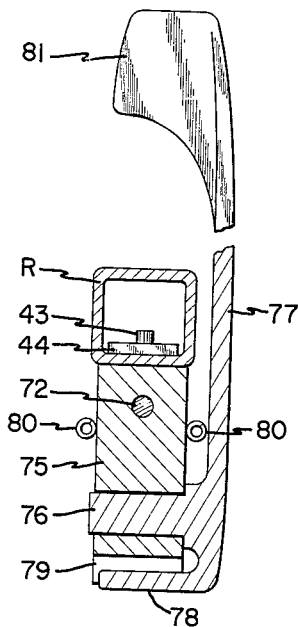
FIGURE 4 is a sectional view taken along the lines 4—4 of FIGURE 2.
Figure 3:
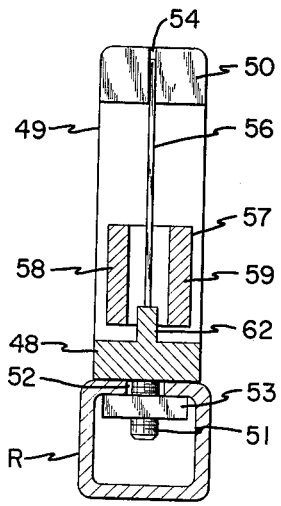
FIGURE 3 is a sectional view taken along the lines 3—3 of FIGURE 2.

Now as to the most important part of this invention, namely the suspension means or vibrating cradle for the rotating body B, reference in particular is made to FIGURES 2, 3 and 4. It will be noted that arm 8 and portion 15 each include offset areas 40 and defining horizontal and vertical surfaces 41 and 42. Areas 40 together with the dashpot coupling shafts C and the dashpots of units P form the sole supports for the suspension means comprising sections S and S' which together form the vibrating cradle for body B and since they are identical, like numerals will be given each and only section S will be described. Secured by bolts means 43 to flat surface 41 is a flat resilient connector 44 in the form of a rectangular body of metal and thickness capable of some resiliency and elasticity. This connector 44 extends only a relatively short distance towards the front of machine 1 and as will be more fully explained hereinafter, functions as a resilient connection with the frame structure and it also provides lateral rigidity and strength for suspension section S. Secured by bolt means 45 to the free end of said connector 44 is a hollow elongated member R of substantially tubular cross section, said member somewhat adjacent its other end being connected to coupling shaft C through suitable nut means 46. Mounted on member R is a bearing frame represented at 47 and generally comprising a U-shaped body having a base 48 with the legs 49 thereof extending upwardly and the tips 50 toward each other. The base is solid and depending therefrom adjacent the rear and front are two bolts, one of which is shown at 51 having a threaded stem of a size to pass through the slot 52 in the top face or surface of member R and be engaged by nuts, such as at 53, to securely hold the frame 47 in position but due to the rod R being hollow, of course the bearing frame may easily be removed for repair and adjustment.

Now further considering the frame 47, the tips 50 are each slotted as at 54 to permit through means 55 one end of leaf springs 56 to be secured and depend therefrom. Numeral 57 represents a member in the form of a trunnion cradle having spaced legs 58 and 59 terminating in solid portions 60 to which the other ends of spring 56 are secured as at 61 whereby the trunnion cradle 57 is suspended solely by leaf springs 56. Thus, cradle 57 is suspended for self-adjustment and to prevent too much transverse movement there is upstanding from the top of base 48 spaced, limiting lugs 62 which are located between legs 58 and 59. Axially aligned slots or recesses 63 are provided in the upper surface of legs 58 and 59 for selectively receiving shafts 64 and 65 of each bearing wheel 66 and 67, respectively. The wheels are rotatable in the same plane and will have their axes spaced apart a distance so that a shaft or arbor can be supported and freely rotate on the wheels as trunnion bearings, all as shown in FIGURE 1.

Depending from member R is a stop portion 70 having an exposed slot 71 directed toward area 40 for receiving the free end of a spring-like part 72 in the form of a metal rod having resilient characteristics. Part 72 at one end forms integrally arm 8 and extends from surface 42 and adjacent but spaced from its free end is supported by a rigid pipe 73 upstanding from the top 5. Mounted for sliding movement on part 72 is adjustable fulcrum means comprising a block 75 through which part 72 extends and terminating in a knife edge 82 in engagement with the underside of member R. Connected with block 75 through a boss 76 is a lever arm 77 having an upstanding handle portion and an extended bottom 78. Surrounding block 75 are "walking" arms 79 maintained under bias by means 80. As should be apparent, to change the location of edge 82 relative to member R, when the lever 77 is pivoted to the right or left as viewed in FIGURE 2, the bottom 78 causes the arm 79 on the side opposite the side of lever movement to bind and cause block 75 to be moved relative to arm 79 and in effect, as should be clear, a "walking" of the block 75 relative to member R whereby the fulcrum means location may be easily adjusted in accordance with balancing conditions.

In operation, the rotatable body B is positioned on the wheels 66 and 67 of sections S and S', the button 36 depressed and the rotating belt 34 caused to engage the body B to impart the necessary rotation thereto. The knife edge 82 is positioned on spring-like part 72 to provide the desired vibratory phase and, of course, by adjusting the fulcrum means there may be infinite vibratory phases. As explained in Patent 2,663,184, the vibrations caused by the rotating body are sensed by the pickup units P and precision observations and readings are made to determine the unbalance, if any, of body B. In said patents, such as 2,761,323, the leaf spring is the vibrating element and substantial stabilizing structure is necessary to provide lateral rigidity, all of such structure being costly and composed of a substantial number of parts. The present suspension means comprising sections S and S' are greatly simplified, the connector 44 which functions as a frictionless connection (a true pivot joint would not be feasible due to the reduced sensitivity that would result) to eliminate friction loss also providing the necessary rigidity. The elongated member R, spring part 72 and connector 44 coact and combine to provide the spring constant as distinguished from merely the leaf springs of the said patents. Adjusting the position of fulcrum 82 changes the spring constant and permits the amplitude and critical frequency of the vibration to be varied at will because such changes the stiffness and rigidity of the suspension means. This, of course, varies the distance between the fulcrum and the free end of member R which vibrates with part 72, the limit of movement of member R being controlled by the faces of slot 71 being engaged by end 74 of part 72. Summarizing, the suspension means is a new method and technique of adjusting the spring constant by using a spring-like part 72 with fulcrum means 82 adjustable between the elongated member R and part 72. As a comparison, in Patent 2,663,184 the leaf spring is above and the fulcrum slides against a solid member.

From the foregoing it is clear that this invention provides a balancing machine having greatly simplified frame structure and suspension units forming the vibratory cradle to permit precision balancing with a relatively inexpensive machine. Being aware of the possibility of modification in the particular apparatus herein disclosed without departing from the fundamental principles of our invention, we do not intend that the scope of the invention be limited in any manner except as set forth by the appended claims.

What is claimed is:

1. In apparatus for balancing a rotatable body comprising a frame structure, a vibratory cradle mounted on the frame structure comprising two spaced suspension sections, each section comprising an elongated member, one end of said member being free to vibrate and having mounted thereon adjacent its free vibrating end bearing means for supporting the rotatable body at axially spaced points, a relatively short resilient connector mounted at one end on the frame structure, the other end of said member being secured to the connector adjacent its other end, a spring-like part mounted on said frame structure beneath said connector and member and arranged substantially coplanar therewith, fulcrum means connected and positioned between the part and member, the position of said fulcrum means being adjustable, the part, member and connector coacting with the adjusted fulcrum means to provide the vibratory phase of said member, and means responsive to the vibration of the member of each section for sensing the vibrations imparted to the sections.

2. Balancing apparatus as defined in claim 1 wherein the fulcrum means of each section comprises a block movable in sliding relationship on said spring-like part and having a knife edge in engagement with the underside of said elongated member.

3. Balancing apparatus as defined in claim 1 wherein stop means is provided for limiting the vibratory movement of each member, said stop means comprising a portion depending from said elongated member and provided with a slot within which one end of said spring-like part extends, the walls of said slot cooperating with the one end of said part to limit the relative movement of said member and part.

4. Balancing apparatus as defined in claim 1 wherein the elongated member is substantially tubular with the other end of the connector extending partially within the elongated member.

5. Balancing apparatus as defined in claim 1 wherein the frame structure includes a pair of spaced damping supports connected by a rod, each support comprising a hollow housing for containing a damping medium.

6. Balancing apparatus as defined in claim 1 wherein the frame structure includes a pair of spaced damping housings connected by a rod, a mounting carried by said rod, a rigid arm extending upwardly and rearwardly from one of said housings and a second rigid arm extending upwardly and rearwardly from said mounting, said connectors being secured at the one end thereof to said rigid arms.

7. Balancing apparatus as defined in claim 6 wherein one of said rigid arms extends upwardly and rearwardly from each housing, a rail connecting said rigid arms extending from said housings, one of the suspension sections being carried by said mounting and the other being carried by one of said housings, the rigid arm from said mounting being movable relative to said rail whereby the suspension sections may be adjusted relative to each other to accommodate rotatable bodies of varying size.

8. Balancing apparatus as defined in claim 7 wherein all three rigid arms are positioned in susbtantially coplanar relationship.

9. A suspension unit for use in connection with apparatus for balancing a rotatable body wherein the vibrations of the unit are sensed; comprising an elongated member, one end of said member being free to vibrate and having mounted thereon adjacent its free vibrating end bearing means for supporting the rotatable body, a resilient connector mounted at one end on the apparatus, the other end of said member being secured to the connector adjacent its other end, a spring-like part mounted beneath said resilient connector and member and arranged substantially coplanar therewith, fulcrum means connected and positioned between the part and member, the position of said fulcrum means being adjustable, the part, member and connector coacting with the adjusted fulcrum means to provide the vibrating phase of said member.

10. Apparatus as defined in claim 9 wherein stop means is provided for limiting the vibratory movement of said member, said stop means comprising a portion depending from said elongated member and provided with a slot within which one end of said spring-like part extends, the walls of said slot cooperating with the one end of said part to limit the relative movement of said member and part.

References Cited in the file of this patent

UNITED STATES PATENTS

| | | |
|---|---|---|
| 2,663,184 | Merrill et al. | Dec. 22, 1953 |
| 2,758,487 | Erickson | Aug. 14, 1956 |
| 2,761,323 | Erickson | Sept. 4, 1956 |
| 2,785,572 | Bokorney | Mar. 19, 1957 |

FOREIGN PATENTS

| | | |
|---|---|---|
| 714,351 | Great Britain | Aug. 25, 1954 |